United States Patent [19]
Wolff et al.

[11] 3,947,169
[45] Mar. 30, 1976

[54] APPARATUS FOR MAKING RODS OR TUBES HAVING A FILTER

[75] Inventors: Otto J. Wolff, Devon; Harvey Nungesser, Norristown, both of Pa.

[73] Assignee: Allied Chemical Corporation, New York, N.Y.

[22] Filed: May 13, 1974

[21] Appl. No.: 469,202

Related U.S. Application Data

[60] Division of Ser. No. 23,496, March 27, 1970, abandoned, which is a continuation-in-part of Ser. No. 849,267, Aug. 11, 1969, abandoned, which is a continuation of Ser. No. 568,902, July 29, 1966, abandoned.

[52] U.S. Cl. .............. 425/71; 425/131.1; 425/205; 425/377; 425/404
[51] Int. Cl.² ........................................ B29D 7/20
[58] Field of Search ........ 425/131, 205, 377, 131.1, 425/132, 133.5, 376, 71, 404; 264/172

[56] References Cited
UNITED STATES PATENTS

| | | | |
|---|---|---|---|
| 2,640,033 | 5/1953 | Marshall | 425/131.1 X |
| 3,256,562 | 6/1966 | Heard, Jr. | 425/131 X |
| 3,352,952 | 11/1967 | Marr | 425/131.1 X |
| 3,443,278 | 5/1969 | Nauta | 425/131.1 |
| 3,453,356 | 7/1969 | Kent, Jr. et al. | 264/143 |
| 3,467,743 | 9/1969 | Otani | 425/205 X |
| 3,609,828 | 10/1971 | Compa et al. | 425/131 |
| 3,632,702 | 1/1972 | Carrow | 425/377 X |

FOREIGN PATENTS OR APPLICATIONS

| 610,777 | 10/1960 | Italy | 425/131 |
|---|---|---|---|

*Primary Examiner*—R. Spencer Annear
*Assistant Examiner*—Mark Rosenbaum
*Attorney, Agent, or Firm*—Michael S. Jarosz; Ernest D. Buff

[57] ABSTRACT

Apparatus for producing composite thermoplastic extrusion products comprising first and second extruder barrels communicating with one another so that the output of the first extruder barrel is directed to the input of the second extruder barrel, the output of said second extruder barrel being greater than the output of said first extruder barrel. Motor means and heating means for rotating and heating extruder barrels and hoppers for introduction of plastic materials and fillers is also provided.

3 Claims, 4 Drawing Figures

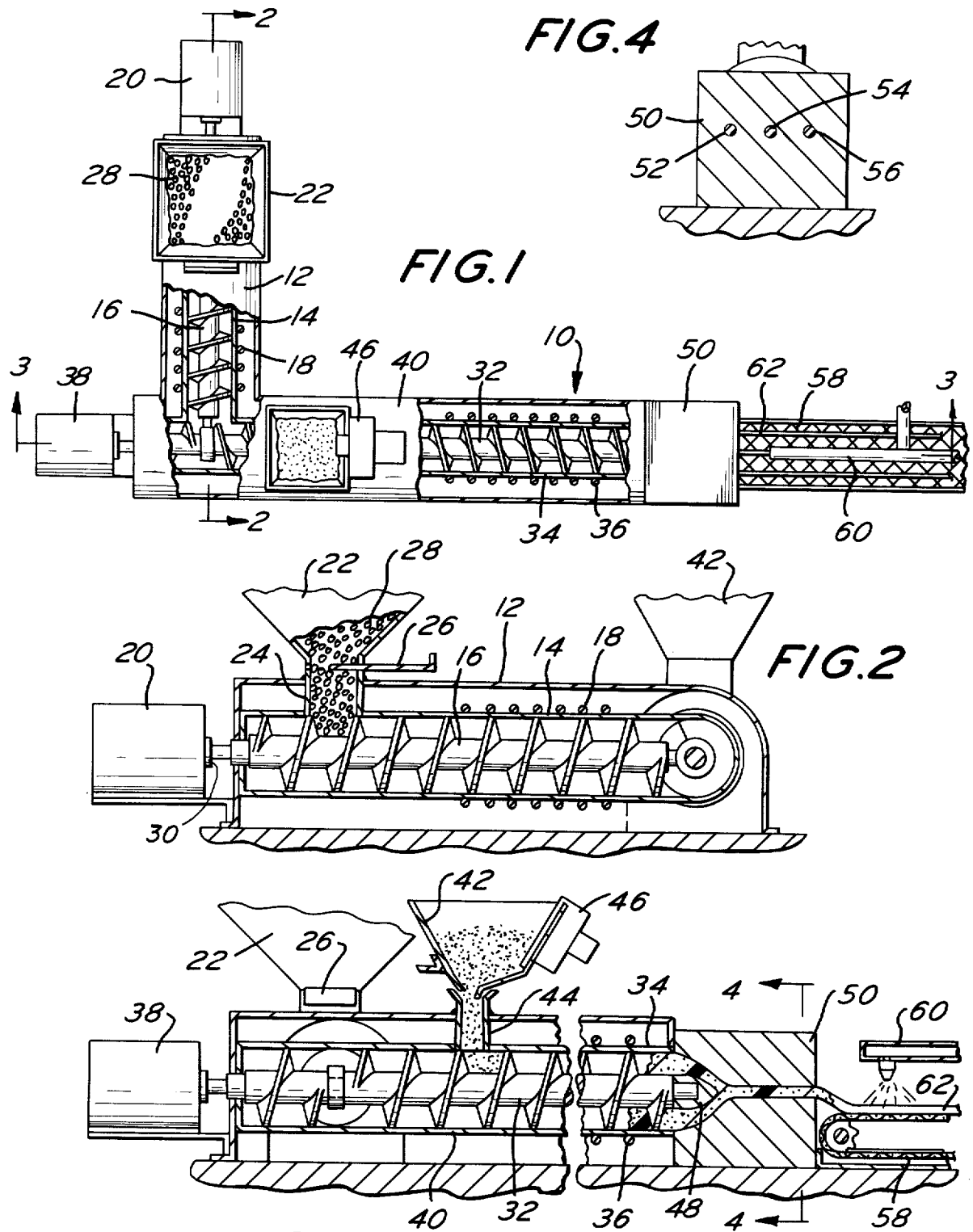

APPARATUS FOR MAKING RODS OR TUBES HAVING A FILTER

This is a division of application Ser. No. 23,496, filed Mar. 27, 1970, now abandoned, which is a continuation-in-part of application Ser. No. 849,267 filed Aug. 11, 1969 now abandoned, which is a continuation of Ser. No. 568,902, filed July 29, 1966, now abandoned.

This invention relates to apparatus and method for making rods or tubes having a filler. More particularly, the invention is directed to apparatus and method for making rods or tubes from a polymeric plastic material having a filler which is an abrasive.

Rods or tubes having a filler have been proposed heretofore. However, they have suffered from poor uniformity in that the filler is not distributed throughout the substance of the rod or tube. Thus, heretofore, filler and plastic molding granules have been introduced into a hopper. Such methods result in poor uniformity of distribution since the filler is generally heavier and smaller in particle size than the thermoplastic molding pellets, thereby settling to the bottom of the hopper. In addition, such usage of a single hopper into which filler and molding pellets are introduced creates a terrific problem of wear when the filler is an abrasive. Such wear occurs at the throat plate at the feed end of the feed screw to such an extent that within one or two days a replacement is required.

The above-mentioned problems and others attendant thereto are solved by the present invention wherein the filler is not mixed with the plastic molding pellets in the same hopper. Instead, the plastic molding pellets, which may be thermoplastic or thermosetting, are rendered to a semi-liquid state before the filler is introduced thereinto. The liquid or semi-liquid state of the plastic envelops the filler so as to reduce wear on the components of the apparatus. Uniformity of distribution of the filler throughout the plastic carrier is attained by means of an extrusion screw. The products of the present invention are in the form of a rod or tube having a wide variety of cross-sectional configurations and may have, for example, a diameter from about 0.01 inch to 0.125 inch.

The extruded products of the present invention may be cut into unit lengths such as five to ten inches, thereby forming bristles which can be utilized in making abrasive wheels. The unit lengths may be two to three feet long for use in making brooms. Alternatively, the unit lengths may be one-eighth to one-quarter inch for use as injection molding granules or pellets for making a wide variety of molded products.

The apparatus of the present invention is in the form of two separate extrusion cylinders each having a screw rotatable therein. The cylinders are preferably disposed at right angles so that separate driving motors may be utilized with the individual screws whereby the second screw may be driven at a slightly faster rate than the first screw. However, an in-line extrusion device could be used so long as the capacity of the second cylinder is greater than that of the first. The outlet end of the second cylinder is provided with an extrusion die for extruding the product of the present invention onto a conveyor belt. A liquid such as water may be discharged onto the extruded products while they are supported on the conveyor belt to facilitate cooling and solidification of the product.

It is an object of the present invention to provide novel apparatus and method for making extruded rods or tubes.

It is another object of the present invention to provide apparatus and method for extruding rods or tubes having a filler distributed throughout the same while substantially prolonging the life of the apparatus.

It is another object of the present invention to provide novel apparatus and method for providing a composite extruded product wherein a plastic carrier is first liquefied before a filler is mixed therewith.

It is another object of the present invention to provide apparatus and method for producing an extruded composite product in the form of a plastic tube or rod having a filler more uniformly distributed than can be attained with apparatus and method proposed heretofore.

It is another object of the present invention to provide a method wherein only the skin portion of a rod or tube has a filler distributed therein.

It is another object of the present invention to provide apparatus and method for producing extruded plastic rods or tubes in a manner which is simple, reliable, and inexpensive.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a top plan view of the apparatus of the present invention with portions broken away from purposes of illustration.

FIG. 2 is a sectional view taken along the line 2—2 in FIG. 1.

FIG. 3 is a sectional view taken along the line 3—3 in FIG. 1.

FIG. 4 is a sectional view taken along the lines 4—4 in FIG. 3.

Referring to the drawing in detail, wherein like numerals indicate like elements, there is shown in FIG. 1 an extrusion apparatus in accordance with the present invention designated generally as 10. The apparatus 10 includes a first housing 12 having an extrusion cylinder 14 disposed therewithin. An extruder screw 16 is disposed within the cylinder 14 and rotatably mounted therein. A heating coil 18 surrounds the cylinder 14. Coil 18 is preferably adjusted so as to have a temperature between about 20° and 100°F. above the melting point for the plastic material. For example, if the plastic material is nylon, the temperature of coil 18 would be between 500° and 525°F.

A motor 20 is connected to one end of the screw 16 to rotate the same about the longitudinal axis thereof. A hopper 22 has its throat 24 communicating with the lefthand end of the screw 16 as shown more clearly in FIG. 2. Control of flow of molding pellets 28 from the hopper 22 into the cylinder 16 is effected by an adjustable valve member 26. The pellets 28 are preferably thermoplastic molding pellets. Any thermoplastic can be used including the following: nylon (type 6, 6–6, 6–10, 6–11), polypropylene, polycarbonate (Lexan), acetals (Delrin), acrylics, polyethylene, polyurethane, polyvinylchloride, polystyrene, ethylene vinyl acetate copolymer, polyester and combinations thereof.

As shown more clearly in FIGS. 1 and 2, the end of screw 16 adjacent to from the motor 20 is provided with a bearing 30. Bearing 30 supports screw 16 so that the latter may rotate about its longitudinal axis. Screw 32 is similarly supported by a bearing. Screw 32 is disposed within an extruder cylinder 34 surrounded by a heating coil 36. Coil 36 corresponds to coil 18 described above.

A motor 38 is connected to the lefthand end of screw 32 as shown more clearly in FIG. 3. Motor 38 preferably has a speed which is up to fifty percent greater than the speed of motor 20 so that screw 32 may rotate at a speed up to fifty percent greater than the speed of screw 16.

Cylinder 34 is disposed within a housing 40. A hopper 42 is provided with its throat 44 communicating with the cylinder 34. Hopper 44 is separate from its throat and provided with a vibrator 46. Control of flow of filler from the hopper 42 into the cylinder 40 may be effected by means of a valve member as described above in addition to varying the speed of the vibrator 46. A wide variety of devices are commercially available for controlling the relative rate of filler with respect to the rate of feed of the plastic pellets 28 into the cylinders 14.

The screw 32 is provided with a pointed tip 48 partially projecting into a multi-orifice die 50. As shown in FIG. 4, the die 50, for purposes of illustration, has three orifices identified by the numerals 52, 54, and 56. For purposes of illustration, the apparatus 10 is extruding three solid rods 62.

A mesh conveyor belt 58 is provided for receiving the extruded products such as rods 62 and conveying the same in a direction away from the die 50. The rods 62 are cooled and permitted to rapidly solidify by spraying water from nozzles secured to manifold 60. Thereafter, the rods 62 are chopped into unit lengths ranging from one-eighth of an inch to three feet depending upon the nature of the product to be made therefrom as described above. Any conventional chopping or cutting apparatus may be utilized.

By trial and error, the rate of feed to the filler may be correlated to the rate of feed of the plastic pellets 28 into their respective extruders. Since the filler is mixed with the plastic in cylinder 40, at which point the plastic is in a liquid or semi-liquid state, the filler is enveloped by the plastic thereby preventing the filler from having deleterious effects on the apparatus.

The amount of filler added may be varied depending upon the nature of the filler. For example, when the filler is an abrasive grit, the percentage of grit by weight to the plastic may vary between 5 and 65 percent, but will preferably constitute 20% by weight with respect to the plastic.

The present process is particularly useful in preparing abrasive filled thermoplastics wherein the abrasives have a hardness value, as rated by the Knoop Scale, greater than 800 and preferably greater than 1000. The Knoop Scale values are determined by measuring the indentation resulting when a weighted diamond pyramid penetrates the test material. Thus the hardness value is experienced as the load in kilograms divided by the projected area in square millimeters.

In addition to the aforementioned hardness, the abrasives found most useful were those which will pass through screens size 10-1500, preferably 80-500. Accordingly, the abrasive filler may be aluminum oxide and silicon carbide each having a grit size ranging from 10-1500, preferably 80-500 and a hardness value of 1,250-1750 for aluminum oxide and 2,130-2,500 for silicon carbide, or the abrasive filler may be diamond dust having a grit size of 80-320 and a hardness value of 5,500-6,950. Although aluminum oxide, silicon carbide and diamond dust are the preferred abrasive fillers, other abrasives having the aforementioned hardness and grit sizes can be utilized. Representative examples of other abrasives employable in the present process are boron carbide, tungsten carbide, tantalum carbide and the like.

When the thermoplastic material utilized is nylon, chopped glass fibers may be incorporated with the abrasive fillers to give added strength to the finished article. When such a filled product is desired, the chopped glass fiber may be added by mixing with the nylon pellets prior to the addition of said material in the extruders, or the two materials may be simultaneously fed into the extruder. Alternatively, the glass fibers may also be added to the molten nylon in the second extruder simultaneously with or as a mixture with the abrasive filler component.

When glass reinforced abrasive containing thermoplastic articles are prepared, the chopped glass fibers comprise one to fifty percent, preferably 20 to 30 percent by weight with respect to the plastic, the abrasive component being present in the amounts stated above.

It is often desirable to produce the product 62 in crimped form for added strength purposes. Such crimping is accomplished by passing the rod 62 between serrated rolls after discharge from the die orifices and before being subjected to the water spray from the nozzles on manifold 60.

It is often desirable to produce a product wherein the filler is distributed throughout a skin portion of the rod. This may be accomplished by extruding the product in the form of a tube as described above. After the product is cut into unit lengths, the hollow tubes may be filled with a solid rod in any convenient manner. Alternatively, the composite rod could be formed by using a cross-head extruder wherein the skin portion containing the filler is extruded around a solid core of the same or different material having entirely different properties. For example, the core could be a metal wire. In this manner, the end product will have the filler distributed throughout the skin portion of the product for depth corresponding to the wall thickness of the tube.

The above reference to the fact that screw 32 is rotated at a speed greater than the speed of rotation of screw 16 presumes that the screws are identical in size and length. The screws may be rotated at the same speed, or screw 16 may be rotated at a speed higher than the speed of screw 32, if the capacity and size of screw 32 is greater than that of screw 16. The object to be attained is that the output from cylinder 40 should exceed the output from cylinder 14.

It is often desirable to orient the product 62. It is old in the art, per se, to orient thermoplastics to increase the tensile strength. It has been found that in brushes made from product 62 and rotated at high speeds, the bristles tend to elongate if the product 62 was unoriented. If an oriented product is desired, the product 62 may be subjected to a stretching process before the cutting step. A suitable stretching process could include wrapping the water cooled solidified product 62 around Godet rolls driven at different speeds. Other known stretching processes may be used. Thereafter, the oriented product may be crimped, cooled to room temperature, and then cut to desired lengths. The crimping step may be eliminated if desired.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for making an extruded product composed of a thermoplastic material and an abrasive filler, comprising first and second extruder barrels communicating with one another so that the output of the first extruder barrel is directed into the input of the second extruder barrel, an extruder screw in each barrel, the output of said second extruder barrel being greater than the output of said first extruder barrel, motor means for rotating the screws, means for heating the extruder barrels, a first hopper communicating with the inlet end of the first barrel for introducing thermoplastic material to said first barrel, said second hopper communicating with said second barrel downstream from the inlet end of said second barrel for introducing abrasive particles to said second barrel, an extrusion die coupled to the outlet end of the second extruder barrel, whereby said thermoplastic material may be introduced into the first extruder barrel from the first hopper, melted in said barrel, and said abrasive filler may be introduced from the second hopper into the melted thermoplastic material, and the mixture extruded through at least one orifice on the die.

2. Apparatus in accordance with claim 1 wherein said extruder barrels are disposed at right angles to one another, a separate motor is connected to each screw, and the greater output of said second extruder barrel is effected by operating the motor connected to the second screw at speeds in excess of the speed of the motor connected to the screw in the first extruder barrel.

3. Apparatus in accordance with claim 2 including a conveyor belt for receiving the extruded product from the die orifice, and nozzle means for spraying water onto the extruded product supported by the conveyor belt.

* * * * *

UNITED STATES PATENT AND TRADEMARK OFFICE
CERTIFICATE OF CORRECTION

PATENT NO. : 3,947,169
DATED : March 30, 1976
INVENTOR(S) : Otto J. Wolff and Harvey Nungesser It is certified that error appears in the above-identified patent and that said Letters Patent are hereby corrected as shown below:

<u>IN THE TITLE</u>

"APPARATUS FOR MAKING RODS OR TUBES HAVING A FILTER" should read --APPARATUS FOR MAKING RODS OR TUBES HAVING A FILLER--.

Column 1, line 3 'FILTER" should be --FILLER--.

Column 1, line 44 "0.01" should be --.01--.

Column 1, line 45 "0/125" should be --.125--.

Column 2, line 67 after "to" delete --from--.

Claim 1, line 12 "said" should be --a--.

Signed and Sealed this

Seventeenth Day of August 1976

[SEAL]

Attest:

RUTH C. MASON
*Attesting Officer*

C. MARSHALL DANN
*Commissioner of Patents and Trademarks*